US005530510A

United States Patent [19]
Alligood

[11] Patent Number: 5,530,510
[45] Date of Patent: Jun. 25, 1996

[54] FOLDING VARIABLE FORMAT VIEWFINDER FOR CAMERA

[75] Inventor: John H. Alligood, Penfield, N.Y.

[73] Assignee: Eastman Kodak Company, Rochester, N.Y.

[21] Appl. No.: 449,171

[22] Filed: May 24, 1995

[51] Int. Cl.6 .............................. G03B 13/10; G01C 3/00
[52] U.S. Cl. .................................. 354/222; 33/266
[58] Field of Search ...................... 354/199, 219, 354/222; 33/266, 277; 359/672

[56] References Cited

U.S. PATENT DOCUMENTS

| | | | |
|---|---|---|---|
| 2,917,968 | 12/1959 | Nojiri | 354/222 |
| 4,216,589 | 8/1980 | Beaver | 33/266 |
| 4,283,860 | 8/1981 | Rucker | 33/277 |
| 4,931,818 | 6/1990 | Gates | 354/222 |
| 4,933,694 | 6/1990 | Gates et al. | 354/222 |
| 4,990,946 | 2/1991 | Gates | 354/222 |

*Primary Examiner*—A. A. Mathews
*Attorney, Agent, or Firm*—Roger A. Fields

[57] ABSTRACT

A viewfinder masking assembly having three different aspect ratio masks comprises a single piece three-mask unit with the respective masks connected via living hinges. A mask selector has a camming device for folding one mask behind another in various ways to place a selected mask in a viewing field.

6 Claims, 4 Drawing Sheets

FOLDING VARIABLE FORMAT VIEWFINDER FOR CAMERA

FIELD OF THE INVENTION

The invention relates generally to the field of photography, and in particular to a viewfinder in a camera for viewing a subject to be photographed. More specifically, the invention relates to a viewfinder with an adjustable framing or masking device for changing the format, i.e. the aspect ratio, of the view through the viewfinder to a desired one.

BACKGROUND OF THE INVENTION

When taking a picture, it is necessary to know not only in what direction to aim the camera but also how much of the subject will be included in the picture. For this reason practically every camera has a viewfinder of some kind for framing the subject.

There are known cameras that are intended to take pictures having various formats. For example, the pictures may be interspersed full-size exposures about 36.6 mm×24.4 mm (length×height) and reduced-height panoramic exposures about 36.6 mm×13.3 mm. The viewfinder for these cameras has a masking device for changing the format of the view through the viewfinder in accordance with the format of the exposure to be made.

Other cameras are intended to make exposures having the same format. However, the viewfinder for these cameras has a masking device for changing the format of the view through the viewfinder in accordance with the format desired for a print to be made from the exposure. In this instance, the exposure is provided with an encodement that indicates the format desired for the print.

Conversely, prior art U.S. Pat. No. 4,283,860, issued Aug. 18, 1981, discloses a folding variable format viewfinder comprising a fixed first-format viewing aperture and movable second-format, third-format, fourth-format, and fifth-format viewing apertures pivotally connected to respective sides of the first-format viewing aperture for manual folding successively over the first-format viewing aperture. The first-format viewing aperture approximates the field of view of a 28 mm taking lens. The second-format viewing aperture approximates the field of view of a 35 mm taking lens. The third-format viewing aperture approximates the field of view of a 55 mm taking lens. The fourth-format viewing aperture approximates the field of view of a 135 mm taking lens. The fifth-format viewing aperture approximates the field of view of a 200 mm taking lens.

SUMMARY OF THE INVENTION

A folding variable format viewfinder comprising a fixed first-format viewing aperture, a movable second-format viewing aperture pivotally connected to one side of the first-format viewing aperture for selective folding over the first-format viewing aperture, and a movable third-format viewing aperture pivotally connected to another side of the first-format viewing aperture for selective folding over the first-format viewing aperture, is characterized in that:

selective control means is coupled with the second-format and third-format viewing apertures for movement in one direction to fold the second-format viewing aperture over the first-format viewing aperture and in a reverse direction to fold the third-format viewing aperture over the first-format viewing aperture.

DETAILED DESCRIPTION OF THE INVENTION

The invention is disclosed as being embodied preferably in a viewfinder for a camera. Because the features of a viewfinder are generally known, the description which follows is directed in particular only to those elements forming part of or cooperating directly with the disclosed embodiment. It is to be understood, however, that other elements may take various forms known to a person of ordinary skill in the art.

Figure 1:
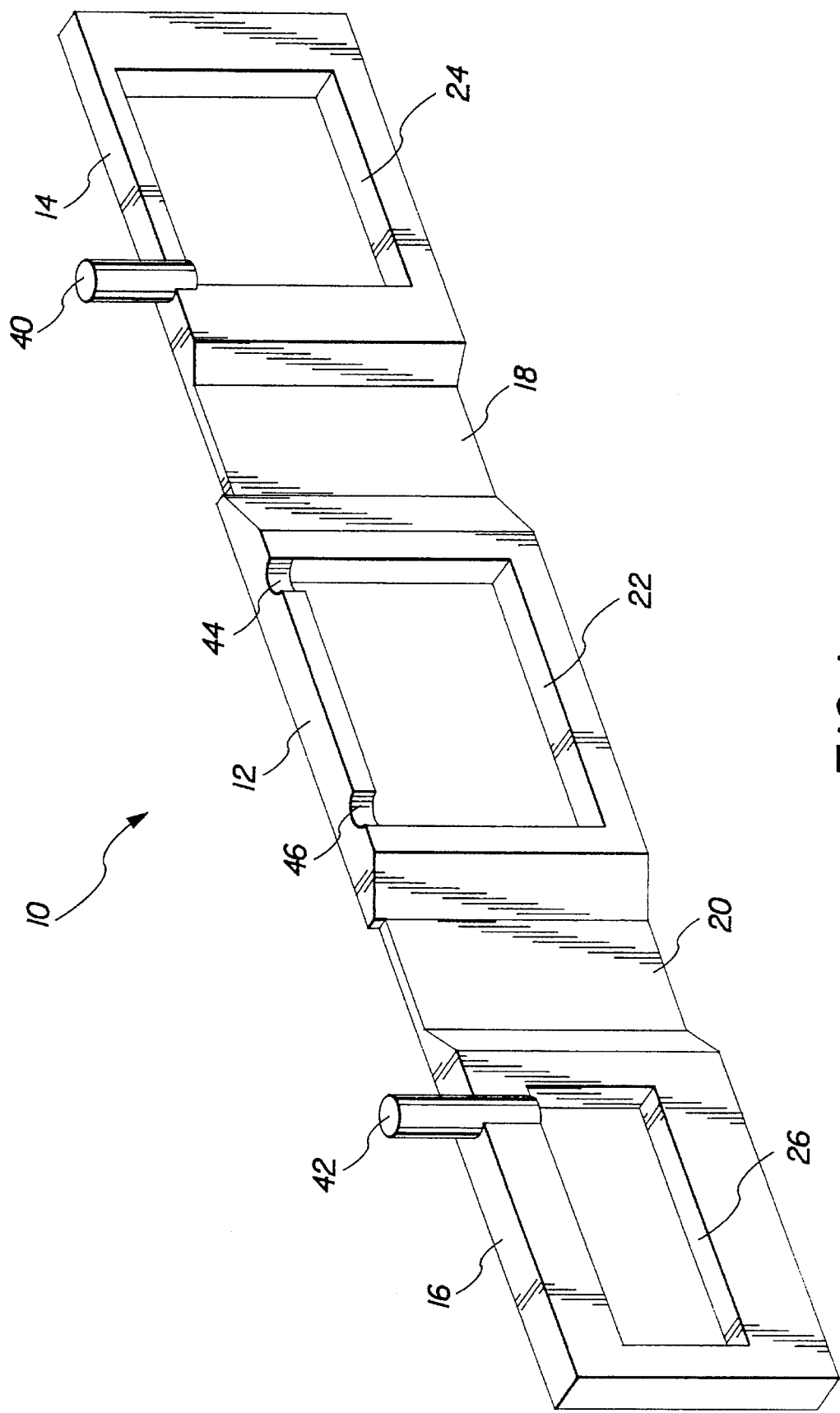
FIG. 1 is a perspective view of first-format, second-format, and third-format viewing apertures of a single piece masking device for a folding variable format viewfinder according to a preferred embodiment of the invention.

Referring now to the drawings, FIG. 1 shows a single piece masking device 10 comprising three masking sections 12, 14, and 16 pivotally connected to one another via two integral living hinges 18 and 20. The masking section 12 has a full-format viewing aperture 22 whose format, i.e. aspect ratio, matches that of a dramatically long print suitable for display on widescreen TV sets. The masking section 14 has a standard or normal-format viewing aperture 24 provided with a height that is the same as the full-format viewing aperture 22 but a shorter length. The format of the normal-format viewing aperture 24 matches that of the usual 3.5× 5-inch and 4×6-inch prints. The masking section 16 has a panoramic-format viewing aperture 26 provided with a length that is the same as the full-format viewing aperture 22 but a shorter height. The format of the panoramic-format viewing aperture 26 matches that of a panoramic or stretch print.

Figure 2:
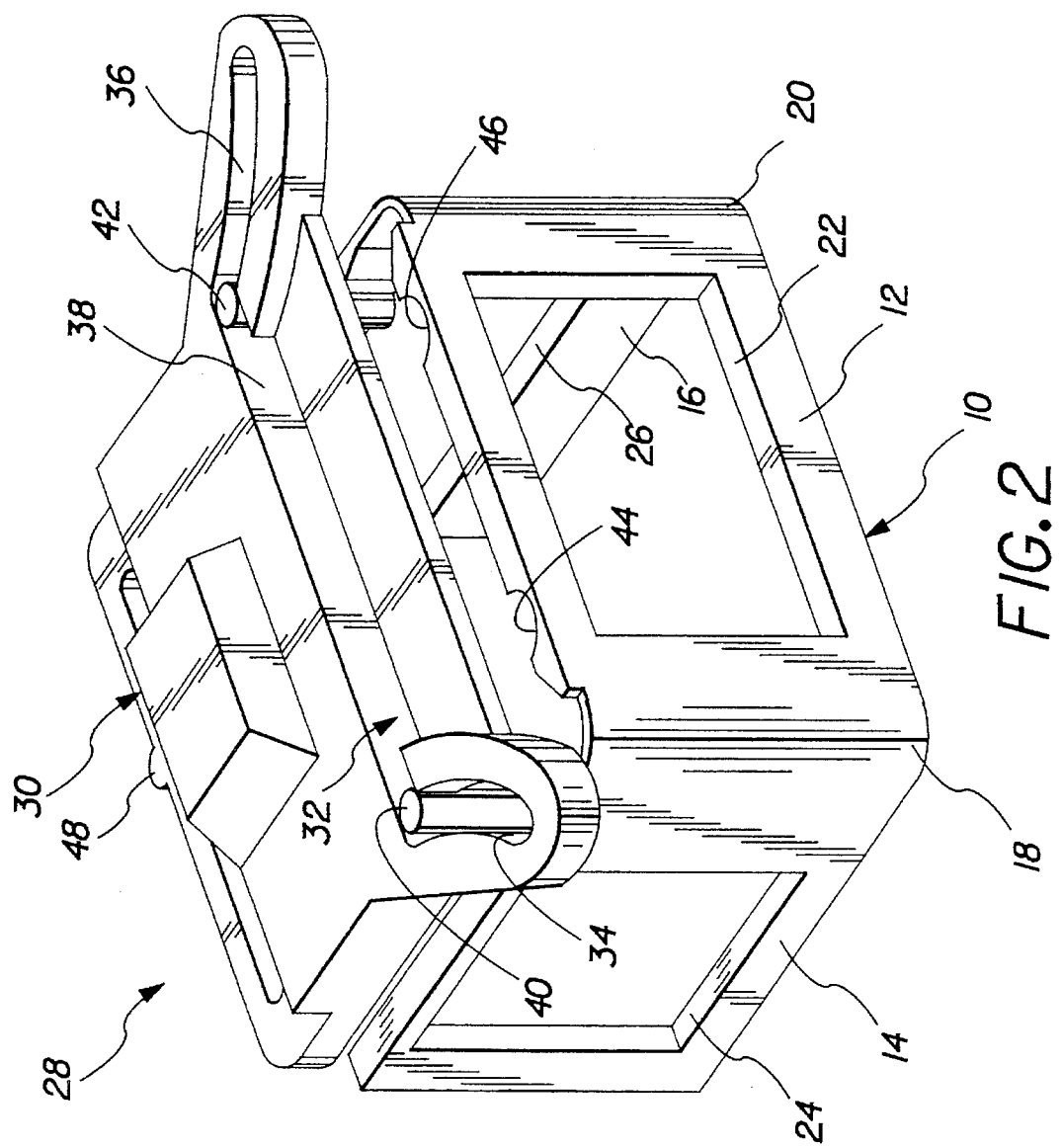
FIG. 2 is a perspective view of the folding variable format viewfinder shown with the first-format viewing aperture in a viewing position.
Figure 3:
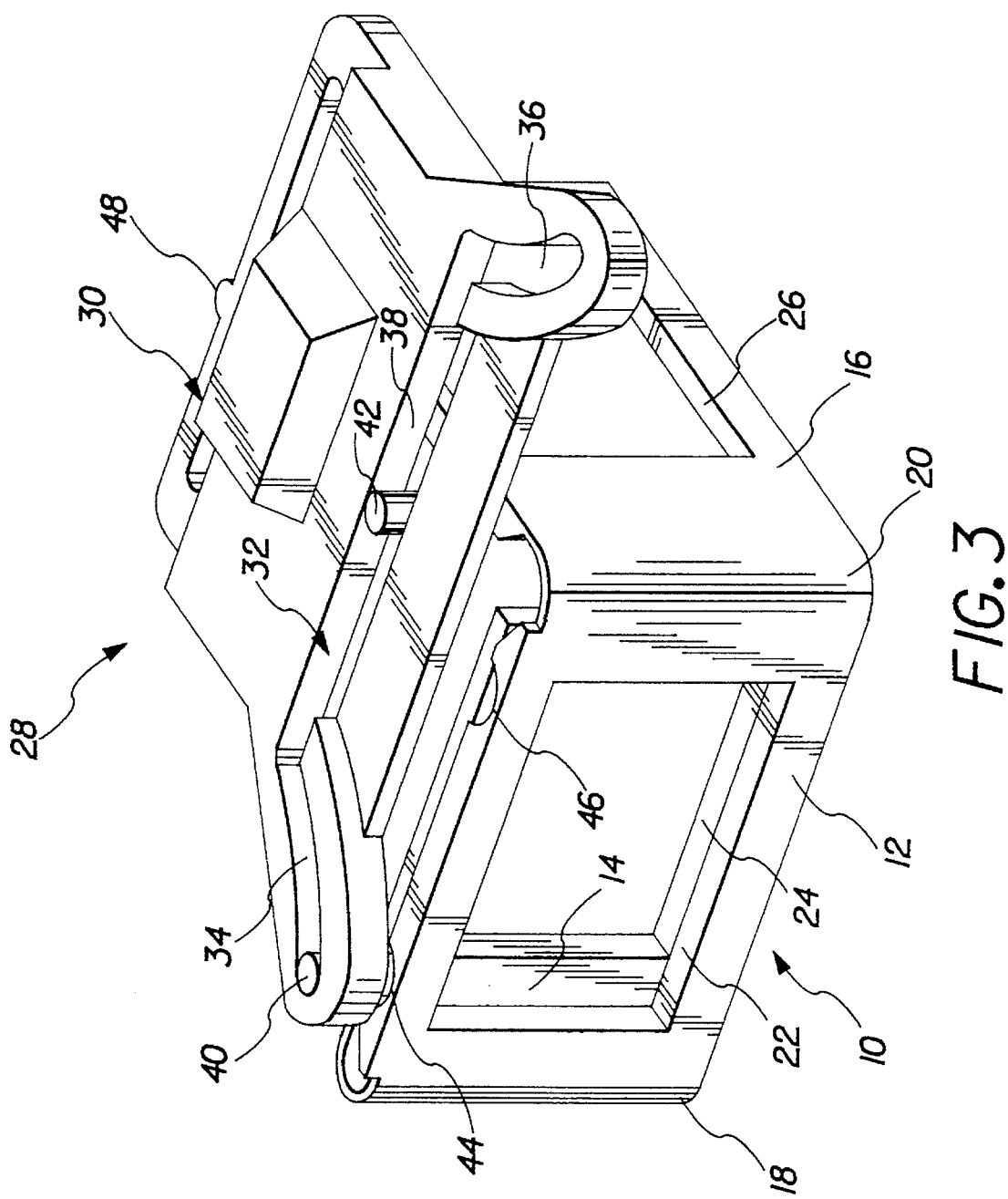
FIG. 3 is a perspective view of the folding variable format viewfinder shown with the second-format viewing aperture folded over the first-format viewing aperture in the viewing position.
Figure 4:
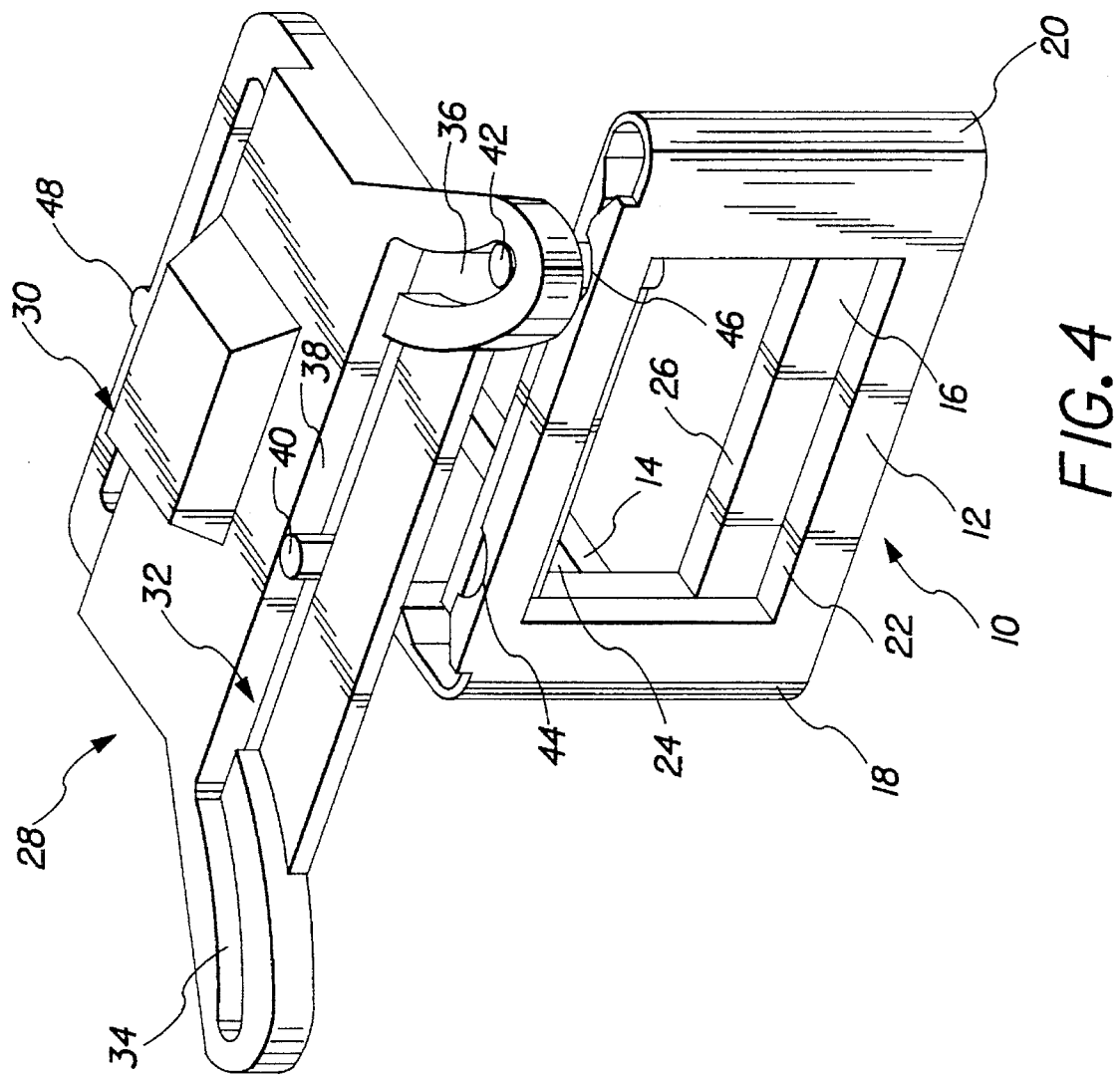
FIG. 4 is a perspective view of the folding variable format viewfinder shown with the third-format viewing aperture folded over the first-format viewing aperture in the viewing position.

A folding variable format viewfinder 28 comprising the masking device 10 and a selective control slider 30 is shown in FIGS. 2–4. FIG. 2 depicts the masking section 12 placed to view the subject to be photographed through the full-format viewing aperture 22. FIG. 3 depicts the masking section 14 folded at the living hinge 18 behind the masking section 12 to view the subject through the normal-format viewing aperture 24 (in registration with the full-format viewing aperture 22). FIG. 4 depicts the masking section 16 folded at the living hinge 20 behind the masking section 12 to view the subject through the panoramic-format viewing aperture 26 (in registration with the full-format viewing aperture 22).

The control slider 30 includes a camming slot 32 having a pair of camming opposite end portions 34 and 36 and an intermediate dwell portion 38 between the camming opposite end portions. Respective cam follower pins 40 and 42 project from the masking sections 14 and 16 into the camming slot 32.

When the cam follower pin 40 projecting from the masking section 24 is located in the dwell portion 38 of the camming slot, at the entrance to the camming end portion 34 of the slot, and the cam follower pin 42 projecting from the masking section 16 is located in the dwell portion, at the entrance to the camming end portion 36 of the slot, as shown in FIG. 2, the masking section 12 is placed to view the subject to be photographed through the full-format viewing aperture 22. If the control slider 30 is moved to the right in FIG. 2, as FIG. 3 depicts, the cam follower pin 42 remains in the dwell portion 38 but the cam follower pin 40 is re-located to the camming end portion 34. Consequently, the masking section 26 is not moved but the masking section 14 is folded at the living hinge 18 behind the masking section 12 to view the subject through the normal-format viewing aperture 24 (in registration with the full-format viewing aperture 22). If the control slider 30 is moved to the left in FIG. 2, as FIG. 4 depicts, the cam follower pin 40 remains in the dwell portion 38 but the cam follower pin 42 is re-located to the camming end portion 36. Consequently, the masking section 14 is not moved but the masking section 16 is folded at the living hinge 20 behind the masking section 12 to view the subject through the panoramic-format viewing aperture 26 (in registration with the full-format viewing aperture 22). If the control slider 30 is moved to the left in FIG. 3, as FIG. 4 depicts, the cam follower pin 40 is re-located from the camming end portion 34 to the dwell portion 38 and the cam follower pin 42 is re-located from the dwell portion to the camming end portion 36. Consequently, the masking section 14 is first unfolded from behind the masking section 12, and the masking section 16 is then folded behind the masking section 12 to view the subject through the panoramic-format viewing aperture 26 (in registration with the full-format viewing aperture 22). If the control slider 30 is moved to the right in FIG. 4, as FIG. 3 depicts, the cam follower pin 42 is re-located from the camming end portion 36 to the dwell portion 38 and the cam follower pin 40 is re-located from the dwell portion to the camming end portion 34. Consequently, the masking section 16 is first unfolded from behind the masking section 12 and the masking section 14 is then folded behind the masking section 12 to view the subject through the normal-format viewing aperture 24 (in registration with the full-format viewing aperture 22).

The masking section 12 has a pair of clearance cavities 44 and 46 for receiving the cam follower pins 40 and 42 as shown in FIGS. 3 and 4.

The control slider 30 has a spring-supported detent 48 which is intended to be received in anyone of three notches, not shown, to releasably hold the control slider in the respective positions of the control slider shown in FIGS. 2–4.

The invention has been described with reference to a preferred embodiment. However, it will be appreciated that variations and modifications can be effected by a person of ordinary skill in the art without departing from the scope of the invention.

PARTS LIST 10. single piece masking device
12. masking section
14. masking section
16. masking section
18. living hinge
20. living hinge
22. full-format viewing aperture
24. normal-format viewing aperture
26. panoramic-format viewing aperture
28. folding variable format viewfinder
30. control slider
32. camming slot
34. camming opposite end portion
36. camming opposite end portion
38. dwell portion
40. cam follower pin
42. cam follower pin
44. clearance cavity
46. clearance cavity
48. detent

I claim:

1. A folding variable format viewfinder comprising a fixed first-format viewing aperture, a movable second-format viewing aperture pivotally connected to one side of said first-format viewing aperture for selective folding over the first-format viewing aperture, and a movable third-format viewing aperture pivotally connected to another side of said first-format viewing aperture for selective folding over the first-format viewing aperture, is characterized in that:

selective control means is coupled with said second-format and third-format viewing apertures for movement in one direction to fold the second-format viewing aperture over the first-format viewing aperture and in a reverse direction to fold the third-format viewing aperture over the first-format viewing aperture.

2. A folding variable format viewfinder comprising a fixed first-format viewing aperture, a movable second-format viewing aperture pivotally connected to one side of said first-format viewing aperture for selective folding over the first-format viewing aperture, and a movable third-format viewing aperture pivotally connected to another side of said first-format viewing aperture for selective folding over the first-format viewing aperture, is characterized in that:

selective control means is coupled with said second-format and third-format viewing apertures for movement in one direction to fold only the second-format viewing aperture over the first-format viewing aperture and in a reverse direction to initially unfold the second-format viewing aperture from over the first-format viewing aperture and to then fold the third-format viewing aperture over the first-format viewing aperture.

3. A folding variable format viewfinder as recited in claim 2, wherein said control means includes a camming slot having a pair of camming opposite end portions and an intermediate dwell portion between said camming opposite end portions and respective cam followers projecting from said second-format and third-format viewing apertures into said camming slot to permit the cam follower projecting from the third-format viewing aperture to be located in said dwell portion and the cam follower projecting from the second-format viewing aperture to be located in one of said camming opposite end portions to fold only the second-format viewing aperture over the first-format viewing aperture when the control means is moved in said one direction and to re-locate the cam follower projecting from the second-format viewing aperture to the dwell portion and the cam follower projecting from the third-format viewing aperture to the other camming end portion to initially unfold the second-format viewing aperture from over the first-format viewing aperture and to then fold the third-format viewing aperture over the first-format viewing aperture when the control means is moved in said reverse direction.

4. A folding variable format viewfinder as recited in claim 3, wherein said first-format, second-format, and third-format viewing apertures are pivotally connected in a row with the first-format viewing aperture located between the second-format and third-format viewing apertures.

5. A folding variable format viewfinder as recited in claim 4, wherein said first-format, second-format, and third-format viewing apertures are a single piece having integral hinges which pivotally connect the respective viewing apertures in a row.

6. A folding variable format viewfinder as recited in claim 2, wherein said control means includes a camming slot having a pair of camming portions and an intermediate dwell portion between said camming portions and respective cam followers projecting from said second-format and third-format viewing apertures into said camming slot to permit one of said cam followers to be located in said dwell portion and the other cam follower to be located in one of said camming portions.

* * * * *